Figure 1:
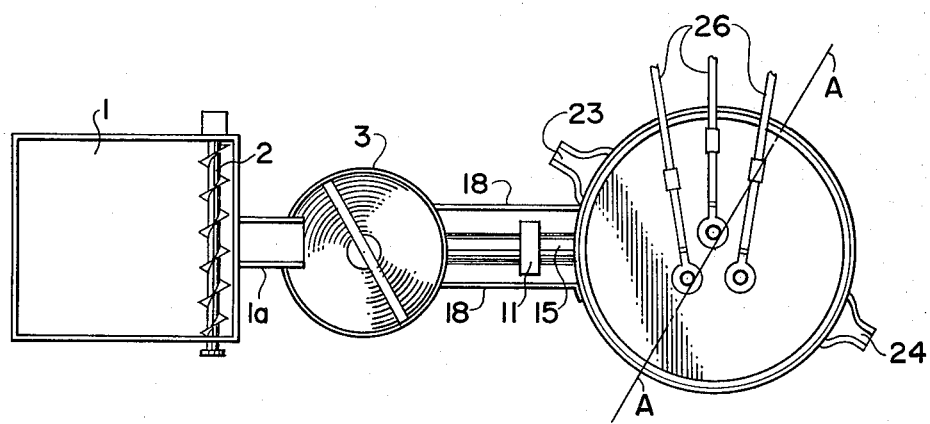

United States Patent [19]

Harwell

[11] 4,225,745
[45] Sep. 30, 1980

[54] METHOD FOR CHARGING SMALL PARTICLES OF IRON OR STEEL DIRECTLY INTO MOLTEN METAL IN AN ARC FURNACE

[76] Inventor: Earnest W. Harwell, 31475 Creekside Drive, Pepper Pike, Ohio 44124

[21] Appl. No.: 939,417

[22] Filed: Sep. 5, 1978

Related U.S. Application Data

[63] Continuation-in-part of Ser. No. 820,301, Jul. 29, 1977, abandoned.

[51] Int. Cl.² ............................................. F27D 3/04
[52] U.S. Cl. ........................................ 13/33; 414/152
[58] Field of Search ................... 13/33, 34; 214/18 R, 214/18 SC

[56] References Cited

U.S. PATENT DOCUMENTS

| | | | |
|---|---|---|---|
| 1,338,881 | 5/1920 | Stock | 13/33 |
| 1,422,135 | 7/1922 | Rogatz | 13/33 |
| 1,674,947 | 6/1928 | Bunce et al. | 13/33 UX |
| 3,939,297 | 2/1976 | Aylard | 13/33 X |

*Primary Examiner*—Roy N. Envall, Jr.

*Attorney, Agent, or Firm*—Baldwin, Egan, Walding & Fetzer

[57] ABSTRACT

A continuous constant or continuous variable intermittent method of charging, over periods sufficiently long not to reduce the process efficiency materially, small particulates of cast iron, carbon steel or alloy steel or stainless steel directly into a bath of similar metal, or the same metal as that being charged, in a melting furnace. The furnace has a feeder chute entering the furnace well below the normal full metal level. A feeding chamber is provided to introduce large masses of small particles of iron or steel into the feeder chute. An hydraulic cylinder and piston motor is positioned at the outer end of the feeder chute, beyond the feeding chamber, to push the small particles or iron or steel into the melting furnace. Oxides such as mill scale can be charged into the bath, which bath has been charged, prior to and during this charging process, with suitable charges of alloys or reducing materials, which materials are charged from the top of the furnace in any conventional practice. The use of this invention is intended for charging a conventional electric arc furnace.

1 Claim, 2 Drawing Figures

METHOD FOR CHARGING SMALL PARTICLES OF IRON OR STEEL DIRECTLY INTO MOLTEN METAL IN AN ARC FURNACE

This application is a continuation-in-part of my co-pending U.S. patent application Ser. No. 820,301, filed July 29, 1977 entitled Method for Charging Small Particles of Iron or Steel Directly into Molten Metal in an Arc Furnace now abandoned.

BACKGROUND OF THE INVENTION

An electric arc furnace can be used to produce a wide variety of ferrous materials, from cast iron through all grades of carbon and alloy steels, as well as a full range of stainless steel grades. The type of processing ranges from a simple re-melting operation to a sophisticated blending and refining using numerous kinds of additives. Conventional charging is through the furnace top after the cover has been raised and swung aside to allow materials to be charged into the furnace bowl. Where hot molten metal is available, this is most desirable as the yield is increased due to cycle reduction. When heavy scrap is the source of the metal, the charge presently must be in large pieces, so-called "heavy melting" or "bundles", as the charge must be heavy enough to drop through the slag layer on top of the remaining melt. The furnace cover is then returned to the covering position, and the electrodes are then lowered into operating position. In the case of a hot metal charge, there is very slight physical resistance to the entrance of the electrodes. However, in the case of bundles or heavy melting scrap, the electrodes are lowered gradually as they create a small puddle around each electrode. This allows the large pieces or bundles to adjust themselves, frequently hitting the electrode hard enough to break or fracture one or more electrodes. This is a high factor in operating costs of an electric furnace in such a process. Also, there is considerable oxidation during this described melt-down process, creating considerable oxide gases and pollutants. In this invention steel or iron particulates are plunged directly into the high temperature bath well beneath the surface level and are almost instantaneously dissolved. This reduces the oxidation of the small particles. Due to the plunger operation design, the charge is propelled into the bath at speeds from forty to one hundred feet per minute. This action creates added turbulence in the bath and separates the particulates to stimulate fast dissolving.

Figure 2:
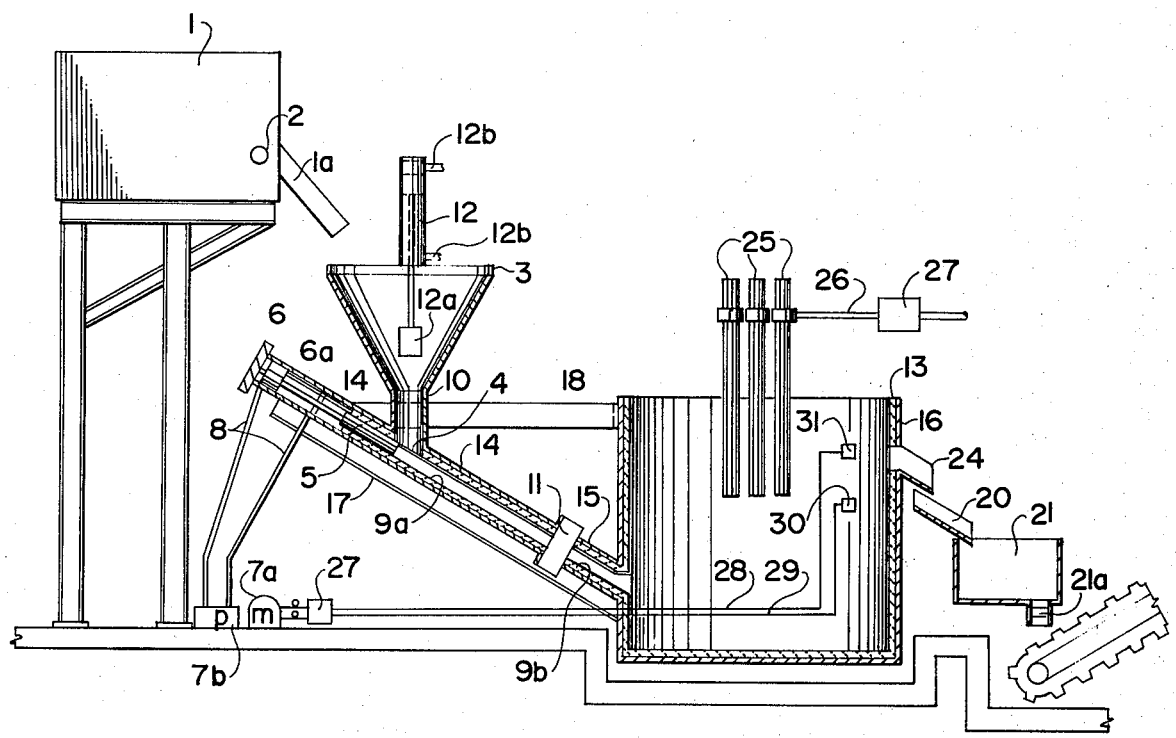

In the drawings,

FIG. 1 is a top plan view of one embodiment of apparatus for carrying out this invention, while FIG. 2 is a central sectional view through the apparatus of FIG. 1.

In the drawings an elevated storage bin 1 receives the metal particles to be treated. A rotatable conveyor 2 aids in feeding the metal particles into the chute 1a which discharges the particles into the loading hopper 3. The particles then move through a feeding chamber 10 into a charging chute structure which includes a steel outer housing 14 having a ceramic liner 9a at its upper end and a ceramic lining 9b at its lower end between the safety gate 11 and the electrode furnace. Due to the possibility of abrading the ceramic walls of the tube 9a, due to the rough shapes of the turnings and borings, it may be found in practice that tube 9a should be lined with a tube of titanium or other suitable heat-resisting metal. The furnace has an outer steel shell 16 and a ceramic lining 13 which is cemented to the charging chute lining 9b.

Means is provided to mechanically force a controlled large quantity of the fine small solid metal particles down the feeder chute 14. This comprises a piston 5 snugly fitting in the ceramic or other material lining 9a and powered by a piston 6 in a cylinder 6a. This cylinder and piston motor is provided by power from a hydraulic pumping unit consisting of a motor 7a driving a pump 7b which is connected by the flexible lines 8 with the opposite ends of the cylinder 6a. Control means, not shown, is provided for controlling the flow of power from the hydraulic pumping system to the cylinder 6a.

Under normal operating conditions, the input of particles as well as the outflow of metal through the trough 20 remain relatively the same in volume, thereby maintaining a constant level of the bath in the furnace. The motor 7a will have two devices incorporated to control the volume of hydraulic fluid delivered to the cylinder 6a thereby increasing or decreasing the amount of finely divided material to be delivered by the piston 5. The rate of melt is controlled by the voltage delivered to the electrodes 25 by the main transformer, not shown, through the power input lines 26 and the manual control 27.

It is intended that the level of the bath in the furnace be kept substantially constant. To accomplish this, a motor control rheostat is activated or deactivated to start or stop the motor 7a thereby determining the rate of input into the furnace. The motor 7a is started by a thermocouple 30 which operates at the lowest desired level, and stopped by a second thermocouple 31 set to operate at the highest desired level in the furnace.

Safety valve 11 is manually operated by a hydraulic or electrically powered plunger. This valve is closed in order to shut down the furance for repairs, relining, or any unforeseeable emergency. To accomplish a complete clean-out of the furnace, all power is shut off to the electrodes and to all motors. As the charging tube 10 is at the same level as the metal bath, some molten metal from the bath will probably work its way up into the ceramic tube 9a. The outside tube 14 of the feed chute is fitted to the valve 11 with a flange mounting. Also, the strut 18 is flange mounted to the shell of the furnace 13 so that when these flanges are unbolted, the entire feed mechanism is pulled clear of the furnace enabling complete tilting of the furnace. This would then permit freedom for maintenance and relining of the furnace. At this point, motor 7a may be started up manually to drive out any solid metal frozen inside the ceramic tube 9a.

If necessary, the cylinder and piston motor 12 is provided with a pusher 12a at its lower end opposite the feeding chamber 10 and the cylinder of this motor has two feed lines 12b and means, not shown, to supply power to drive the pusher 12a downwardly and upwardly as necessary to advance material from the feed hopper 3 to the feeding chamber 10. The furnace 13, 16 has a pouring spout 23 and a metal discharge spout 24 and is supported by means not shown for tilting around the axis AA.

Metal discharged at the spout 24 travels through a trough 20 into tundish 21 from which the metal may be discharged at 21a either into a pig iron casting machine or other means of using the metal produced by the electric furnace.

The usual electrodes 25 are mounted in a standard fashion so as to be raised and lowered into the electric furance 13, 16 and are supplied by current by lines 26 from a control source 27.

This invention is designed to provide a method of charging small particles of iron or steel in various shapes direcly into the existing molten bath in the furnace. The design is such that the operation can be continuous or intermittent, depending upon the next operation. In the case of either the making of pig iron or continuous cast billets or slabs, the hot metal flows continuously through the spout 24 and the ceramic trough 20 into a tundish 21. From the tundish, the hot metal goes into pigging moulds (not shown) or into conventional casting moulds (not shown). The rate of input of solid iron or steel particles will be balanced to the output. Likewise, the power input to the electrodes will be balanced to the solid input, so as to maintain a relatively constant temperature in the bath. The temperature should be slightly higher than the normal pouring temperature so that latent heat in the melt, plus the power input, makes for almost instantaneous melting of the particles into solution.

Before the particles are loaded into the storage bin 1, these particles should be heated and thoroughly dried. Since it is anticipated to use the lowest cost scrap, classified as "turnings and borings", the pieces should be heated to a temperature to flash off any remaining oil that may be adhering to the pieces. These should be crushed to a size where the largent dimension is not over three inches to increase the density and to make for easier feeding into the charging feed tube 10.

Referring to the drawings, the sized and dried pieces are loaded into the elevated storage bin 1. This bin and appurtenances thereto are completely separate and stationary and are so located as to permit free required motion of the charging apparatus. The bin is equipped with a variable, mechanical drive conveyor 2 to feed the particles into the loading hopper 3. the materials flow by gravity from the hopper into the opening in the charging tube 4. The charging piston 5 is propelled down and up by a double-acting hydraulic cylinder 6. This cylinder is actuated by a hydraulic pumping unit 7 through flexible hoses 8. The hydraulic unit is stationary and the hoses are of sufficient length to permit any required motion of the charging unit due to tilting of the furnace housing 13.

The charging tube is made in several parts. The outer housing 14 is steel. The main inner tube 9a is a ceramic tube running from the feeding chamber 10 to the safety gate 11. A continuation of this ceramic tube 9b runs from the safety gate through the wall of the furnace and is cemented to the furnace ceramic lining 13. The entire ceramic tube and the safety gate are supported on the exterior by the steel tube 14 which has a lower section 15 securely welded to the steel body 16 of the furnace itself. The housing 14 is flange bolted to the safety gate 11. Two support struts 18 are flange bolted to the furnace body 13 and welded to the housing 14. By unbolting housing 14 at the flange and unbolting struts 18 at the furnace connection, the entire feed apparatus may be moved away for replacement of the lower section 9b, 15 of the charging tube and other maintenance when furnace relining is required.

It will be noted in FIG. 2 that the feeding chute 14 extends at an acute angle to the horizontal into the furnace 13 and the solid particles of iron or steel enter the feeder chute at 4 which is at a point below the level of the molten metal in the furnace 13.

While the operation and use of the device is described for small iron and steel particles, it could also be used for feeding pellets. This device would not be advisable for use with pellets containing any free carbon because of high temperatures then generated in the charging tube near the furnace.

A screw or gravity feed is possible; but in the case of a freeze-up, a more positive force such as the cylinder and piston motor 5, 6 is a necessity.

The safety gate 11 is actuated by an electric solenoid or a hydraulic cylinder (not shown). Control switches would be located at several strategic positions in the shop for emergency stopping.

What is claimed is:

1. A method of charging small solid particles of iron or steel directly into a mass of similar metal in a melting furnace, comprising mechanically forcing by applied power a large quantity of said solid particles down a feeder chute at an acute angle to the horizontal directly into a molten mass of similar metal in an electrical melting furnace well below the level of said molten metal in said furnace, using a hydraulic cylinder and piston motor, including the step of varying the power input to said cylinder and piston motor responsive to the level of the molten metal in said furnace, the solid particles of iron or steel entering said feeder chute at a point below the level of the molten metal in said furnace.

* * * * *